(12) United States Patent
Tong et al.

(10) Patent No.: US 10,456,963 B2
(45) Date of Patent: Oct. 29, 2019

(54) ELECTRICAL COMPONENT CARRIER AS A STRESSED MEMBER OF AN ELECTRICAL VEHICLE

(71) Applicant: SABIC GLOBAL TECHNOLOGIES B.V., Bergen op Zoom (NL)

(72) Inventors: Zhongcai Tong, Shanghai (CN); Chao Liu, Shanghai (CN); Zhen Yu Xie, Shanghai (CN); Chuangqi Guo, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/774,811

(22) PCT Filed: Nov. 11, 2016

(86) PCT No.: PCT/EP2016/077404
§ 371 (c)(1),
(2) Date: May 9, 2018

(87) PCT Pub. No.: WO2017/081234
PCT Pub. Date: May 18, 2017

(65) Prior Publication Data
US 2018/0333905 A1 Nov. 22, 2018

(30) Foreign Application Priority Data
Nov. 11, 2015 (WO) ................ PCT/CN2015/094293

(51) Int. Cl.
*B29C 45/00* (2006.01)
*B60K 1/04* (2019.01)
(Continued)

(52) U.S. Cl.
CPC .......... *B29C 45/0005* (2013.01); *B29C 44/42* (2013.01); *B29C 45/0001* (2013.01);
(Continued)

(58) Field of Classification Search
CPC . B60K 1/04; B60K 2001/0411; H01M 2/1083
See application file for complete search history.

(56) References Cited

U.S. PATENT DOCUMENTS 6,241,309 B1 * 6/2001 Roehl ................. B62D 25/087
296/198
6,271,270 B1 8/2001 Muzzy et al.
(Continued)

FOREIGN PATENT DOCUMENTS

| DE | 19961853 C1 | 1/2001 |
|---|---|---|
| JP | H097207233 A | 8/1997 |

(Continued)

OTHER PUBLICATIONS

International Search Report for International Application No. PCT/EP2016/077404; International Filing Date: Nov. 11, 2016; dated Feb. 6, 2017; 4 Pages.

(Continued)

*Primary Examiner* — Brian L Swenson
(74) *Attorney, Agent, or Firm* — Cantor Colburn LLP (57) ABSTRACT

The disclosure concerns component carriers including: (i) a first support structure having a generally rectangular cross-section; and (ii) a second support structure having a generally rectangular cross-section, where the first support structure and the second support structure are formed of fiber-filled polypropylene; and where the component carrier is configured to be part of an electrical vehicle.

21 Claims, 4 Drawing Sheets

(51) Int. Cl.
    *H01M 2/10*     (2006.01)
    *B29C 44/42*     (2006.01)
    *B62D 21/11*     (2006.01)
    *B62D 29/04*     (2006.01)
    *B29K 509/08*     (2006.01)
    *B29K 105/00*     (2006.01)
    *B29C 45/17*     (2006.01)
    *B29K 23/00*     (2006.01)
    *B60K 11/04*     (2006.01)
    *B29L 31/30*     (2006.01)
    *B29K 105/04*     (2006.01)
    *B29K 309/08*     (2006.01)

(52) U.S. Cl.
    CPC ............... *B60K 1/04* (2013.01); *B62D 21/11* (2013.01); *B62D 29/04* (2013.01); *H01M 2/1083* (2013.01); *B29C 45/1703* (2013.01); *B29C 2045/1722* (2013.01); *B29K 2023/12* (2013.01); *B29K 2105/0005* (2013.01); *B29K 2105/04* (2013.01); *B29K 2309/08* (2013.01); *B29K 2509/08* (2013.01); *B29L 2031/30* (2013.01); *B60K 11/04* (2013.01); *B60K 2001/0438* (2013.01); *H01M 2220/20* (2013.01)

(56) References Cited

U.S. PATENT DOCUMENTS

| | | | |
|---|---|---|---|
| 6,827,168 B2 * | 12/2004 | Miyazaki | B60R 19/00 |
| | | | 180/274 |
| 8,672,354 B2 | 3/2014 | Kim et al. | |
| 9,472,791 B2 * | 10/2016 | Ojeda | B60K 1/04 |
| 2006/0220405 A1 * | 10/2006 | Ohe | B60R 16/04 |
| | | | 296/37.1 |
| 2008/0217961 A1 * | 9/2008 | Lustiger | B62D 25/084 |
| | | | 296/193.09 |
| 2011/0036654 A1 | 2/2011 | Rinderlin et al. | |
| 2012/0031695 A1 * | 2/2012 | Tsuchiya | B60K 1/04 |
| | | | 180/68.5 |
| 2012/0160585 A1 | 6/2012 | Mildner | |
| 2012/0175177 A1 | 7/2012 | Lee et al. | |
| 2012/0251863 A1 * | 10/2012 | Berger | H01M 2/1083 |
| | | | 429/99 |
| 2013/0252059 A1 * | 9/2013 | Choi | B29C 70/20 |
| | | | 429/100 |
| 2016/0214308 A1 * | 7/2016 | Iwano | B29C 43/021 |
| 2017/0043503 A1 * | 2/2017 | Suzuki | B29C 39/24 |

FOREIGN PATENT DOCUMENTS

| | | |
|---|---|---|
| JP | 2012026522 A | 2/2012 |
| WO | 0238351 A2 | 5/2002 |
| WO | 03007402 A1 | 1/2003 |
| WO | 2013023160 A2 | 2/2013 |
| WO | 2015062825 A1 | 5/2015 |

OTHER PUBLICATIONS

Machine Translation of DE19961853; Date of Publication: Jan. 4, 2001; 7 Pages.
Machine Translation of JP2012026522; Date of Publication: Feb. 9, 2012; 10 Pages.
Machine Translation of JPH09207233; Date of Publication: Aug. 12, 1997; 21 Pages.
Machine Translation of WO0238351; Date of Publication: May 16, 2002; 26 Pages.
Written Opinion of the International Searching Authority for International Application No. PCT/EP2016/077404; International Filing Date: Nov. 11, 2016; dated Feb. 6, 2017; 8 Pages.

\* cited by examiner

ELECTRICAL COMPONENT CARRIER AS A STRESSED MEMBER OF AN ELECTRICAL VEHICLE

CROSS REFERENCE TO RELATED APPLICATIONS

This application is a 371 of International Application No. PCT/EP2016/077404, filed Nov. 11, 2016, which claims priority to International Application No. PCT/CN2015/094293 filed Nov. 11, 2015, which are incorporated herein by reference in their entirety.

TECHNICAL FIELD

The disclosure concerns battery carriers, which can be formed of injection molded long glass fiber-filled polypropylene, and associated methods for making the same. The present subject matter can be used in the construction of electrical vehicles.

BACKGROUND

Many motor vehicles now rely on an electrical motor as a prime mover. Such vehicles include hybrid-electrical vehicles (including light hybrids), electric vehicles and fuel cell powered vehicles (together, "electrical vehicles"). Vehicles that use an electrical motor as a prime mover may use more than one bus voltage. Commonly a 12V bus is used to power traditional loads (e.g., filament lamps), while a higher voltage (e.g. 480V) is used to power the electric motor. The higher voltage can help enable greater torque density, leading to better performance. This architecture can benefit from multiple voltage sources, which can mean two batteries or a battery and a transformer. These components can be carried what is known as a "battery carrier".

Traditional electrical vehicle battery carriers cannot bear loads in excess of the loads caused by the components affixed to them, i.e. the "carrying loads". Often they are formed of multiple stamped steel parts, which have the undesirable features of heavy weight, susceptibility to corrosion, such as from battery acid, and a complicated assembly that can include welding. There is a need in the art for carriers that overcome these shortcomings and meet high mechanical performance requirements such as stiffness and strength.

SUMMARY

The present inventors have recognized, among other things, that a problem to be solved can include lowering vehicle weight and increasing packaging efficiency of a large component carrier for an electrical vehicle. The present subject matter can help provide a solution to this problem, such as by replacing a large portion of the body-in-white with a load-bearing thermoplastic battery carry. This disclosure concerns providing a component carrier including: (i) a first support structure having a generally rectangular cross-section; and (ii) a second support structure having a generally rectangular cross-section, wherein the first support structure and the second support structure are comprised of fiber-filled thermoplastic material, preferably polypropylene; and wherein the component carrier is configured to be connected to a chassis of the vehicle and further configured to be a stressed member of the chassis of the vehicle.

The disclosure also concerns processes of making a component carrier including: introducing a thermoplastic material, preferably a fiber-filled polypropylene, to a hopper of an injection molding machine; melting the fiber-filled polymeric material to form a melt in a plasticizing unit; pressurizing the plasticizing unit of the injection molding machine with a blowing agent; dissolving the blowing agent into the melt; injecting the melt into a mold cavity up to 100% of volume; and forming a first support structure having a generally rectangular cross-section and a second support structure having a generally rectangular cross-section, wherein said component carrier is configured to be a stressed member of the chassis of an electrical vehicle.

BRIEF DESCRIPTION OF THE DRAWINGS

The accompanying drawings are incorporated in and constitute a part of this specification, illustrate examples of the disclosure and together with the detailed description serve to explain the principles of the disclosure. No attempt is made to show structural details of the disclosure in more detail than can be necessary for a fundamental understanding of the disclosure and the various ways in which it can be practiced. In the drawings.

DETAILED DESCRIPTION

An electrical component carrier is configured for use in various kinds of vehicles including electrical vehicles and can be constructed from polypropylene-long glass fiber (PP-LGF) material to fulfill mechanical performance requirements on stiffness and strength needed for a vehicle. A component carrier so constructed can be utilized as a stressed member within a vehicle construction, although the present designs can be useful for carrying loads even if the component carrier is not stressed. Un-stressed component carriers do not translate loads in excess of those experienced from carrying the components attached to the carrier, while stressed component carriers translate loads received from one portion of the body-in-white to another portion of the body-in-white, while providing for satisfactory body rigidity, such as torsional rigidity, natural frequency, etc. Additionally, decreased or no plastic deformation under certain temperature conditions may be required. A component carrier can be used in lieu of traditional body-in-white structural members such as the "K-member", "H-member" or "engine cradle". Stressed member component carriers extend transverse across the vehicle from the bottom of one strut tower to the bottom of the other strut tower. The component carrier can be created out of various additional materials that fulfill the design specification of bearing major loads of the body-in-white. The disclosed component carrier can be integrated as one part and can be made using injection molding, which can reduce costs versus the traditional solution of stamping parts and mechanically assembling the parts with welding, when mass produced. The disclosed component carriers can have high performance-to-weight ratio, which can lead to weight reduction. Some component carriers support a battery module having a plurality of battery cells. Some component carriers can support other battery related components.

The component carrier for carrying electrical components, possibly including a battery, for an electrical vehicle, may comprise:

an injection-molded load-bearing frame to couple with and span from a right damper-tower of the electrical vehicle, transverse across the vehicle, to a coupling with a left damper-tower, the injection-molded load-bearing frame sized to translate dynamic loading from the body-in-white from the right damper-tower to the left damper-tower. The injection-molded load-bearing frame may be comprised of a thermoplastic material, preferably a fiber-filled thermoplastic, more preferably a fiber-filled polypropylene, and may include a plurality of ribs oriented such that the injection-molded load-bearing frame has a first order frequency of 105 Hz or greater, at a temperature of 70° C. Furthermore, the component carrier may have a stiffness in the Z direction of greater than or equal to 350 N/mm. Moreover, the component carrier may have a stiffness in the X direction of greater than 150 N/mm as measured by SAE J2464 with ambient air cycling between at 70° C. and −40° C.

The component may comprise a thermoplastic material, such as polypropylene, polyethylene, polycarbonate, polyamide and the like. For performance improvement, the thermoplastic material may be filled with a filler material. Examples of filler materials may be mineral particles, glass fiber, carbon fiber or the like, preferably long fiber material.

The process of making a component carrier may comprise:

introducing a thermoplastic material to a hopper of an injection molding machine;

melting the thermoplastic material to form a melt in a plasticizing unit;

pressurizing the plasticizing unit of the injection molding machine with a blowing agent;

dissolving the blowing agent into the melt;

injecting the melt into a mold cavity up to 100% of volume; and forming a first support structure having a generally rectangular cross-section and a second support structure having a generally rectangular cross-section, wherein said component carrier is configured to be a stressed member of a chassis of a vehicle. The thermoplastic material may be a fiber-filled thermoplastic material, preferably a long glass fiber-filled thermoplastic, more preferably a long glass fiber-filled polypropylene material.

Figure 1:
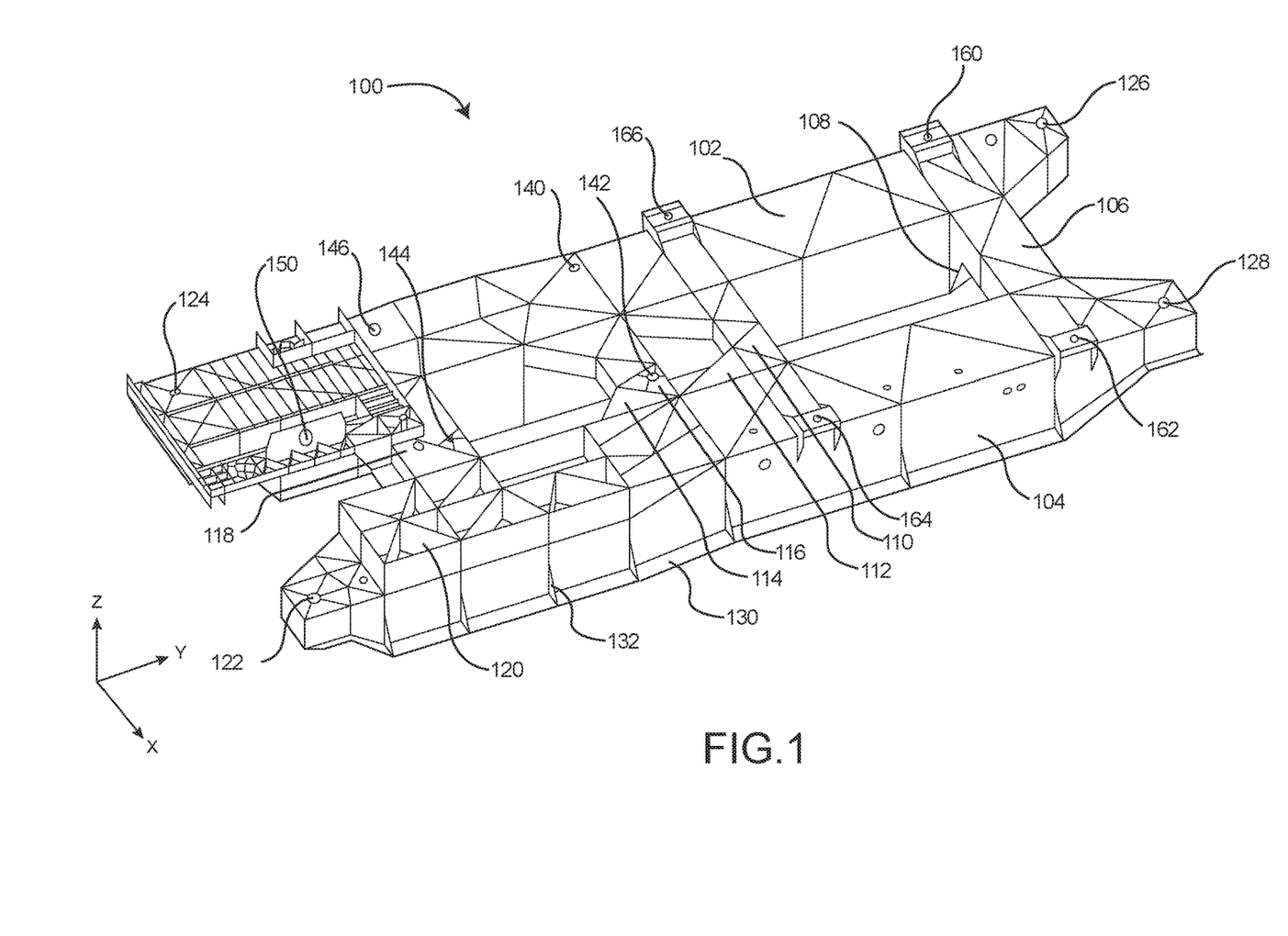
FIG. 1 illustrates a fiber-filled plastic component carrier in an example of the disclosure.

FIG. 1 illustrates a fiber-filled plastic component carrier in an example. As shown in the FIG. 1, a component carrier 100 can include a first support structure 102. The first support structure 102 can include a generally rectangular cross-section, although the present disclosure is not so limited. The first support structure 102 can include an attachment portion 126 arranged at one end and can include an attachment portion 124 arranged at a second opposite end.

The component carrier 100 can include a second support structure 104. The second support structure 104 can include a generally rectangular cross-section. The second support structure 104 can include an attachment portion 128 arranged at one end and can include an attachment portion 122 arranged at a second opposite end. The second support structure 104 can further include one or more reinforcing rib portions. The second support structure 104 can further include one or more reinforcing rib portions 120 along upper surface thereof. In one example the second support structure 104 can further include one or more reinforcing rib portions 130 arranged along lower surfaces thereof. In one example the second support structure 104 can further include one or more reinforcing rib portions 132 arranged alongside surfaces thereof. The first support structure 102 can further include one or more reinforcing rib portions having a similar construction.

A plurality of bolts or other fasteners known in the art can be placed through attachment holes in the attachment portions 122, 124, 126, 128 in order to secure the component carrier 100 to a chassis of a vehicle. In one example, a plurality of compression limiters can be arranged in the attachment holes. The compression limiters can be configured as metal inserts to provide bolt clearance so that the compression limiter withstands a compressive force induced during an assembly of the mating mechanical fastener or bolt in order to secure the component carrier 100 in a more robust manner. Such inserts can be insert molded into the component carrier 100. In another example, a plurality of threaded fasteners can be arranged in the attachment holes in the attachment portions 122, 124, 126, 128. The threaded fasteners can be configured to receive a mating mechanical fastener or bolt in order to secure the component carrier 100 in a more robust manner to a chassis of a vehicle.

A longitudinal axis can be defined (Z axis as shown in FIG. 1) for the first support structure 102 to extend between the attachment portion 126 and the attachment portion 124. Another longitudinal axis (Z axis as shown in FIG. 1) can be defined for the second support structure 104 between the attachment portion 128 and the attachment portion 122. The longitudinal axis of the first support structure 102 can be generally parallel to the longitudinal axis of the second support structure 104.

The component carrier 100 can further include a first cross member 106 extending between the first support structure 102 and the second support structure 104. The first cross member 106 can include a generally rectangular cross-section. The first cross member 106 can further include chamfered portions 108. A longitudinal axis (X axis as shown in FIG. 1) of the first cross member 106 can intersect at an angle the longitudinal axis of the first support structure 102 and the longitudinal axis of the second support structure 104. The angle can be approximately 90°.

The component carrier 100 can also include a second cross member 110, a third cross member 116, a fourth cross member 118, and chamfered portions 112 and 114. Each of the second cross member 110, the third cross member 116, the fourth cross member 118, can have a construction similar to the first cross member 106.

The component carrier 100 can further include a number of attachment points for attaching one or more batteries and one or more battery related components. The component carrier 100 can include attachments 140, 142, 144, 146, 150, 160, 162, 164, 166 configured for attachment of a battery or a battery related component.

A plurality of bolts or other fasteners known in the art can be placed through attachments 140, 142, 144, 146, 150, 160, 162, 164, 166 for attachment of the battery or the battery related component. In one example, a plurality of compression limiters can be arranged with the attachments 140, 142, 144, 146, 150, 160, 162, 164, 166. In another example, a plurality of threaded fasteners can be arranged with the attachments 140, 142, 144, 146, 150, 160, 162, 164, 166. The threaded fasteners and/or the compression limiters can be configured to receive a mating mechanical fastener or bolt in order to secure the battery or the battery related component to the component carrier 100.

Figure 3:
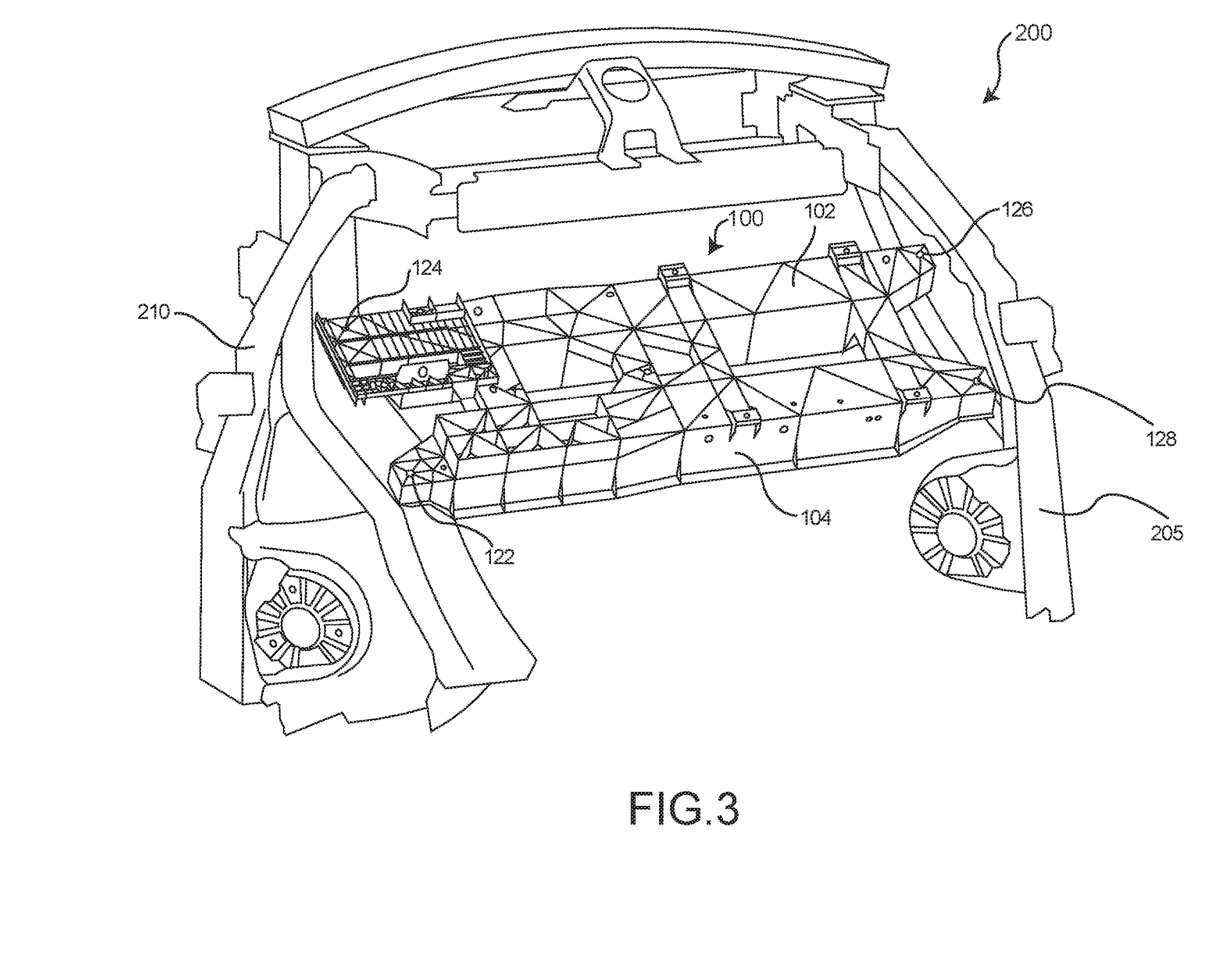
FIG. 3 illustrates the component carrier of FIG. 1 integrated into a chassis of a vehicle.

FIG. 3 is an illustration of one example of the component carrier 100 attached to and serving as a stressed member for a chassis 200 of the vehicle. The first support structure 102 and the second support structure 104 can be attached to portions 205, 210 of the chassis 200 via the attachment portions 122, 124, 126, 128.

The component carrier 100 can be a stressed member carrying a partial stress load from the chassis 200. The stress load can be carried through the attachment portions 122, 124, 126, 128 and the first support structure 102 and the second support structure 104. As the component carrier 100 is a stressed member carrying a stress load from the chassis 200, the overall rigidity and structural strength of the chassis 200 is increased.

Figure 4:
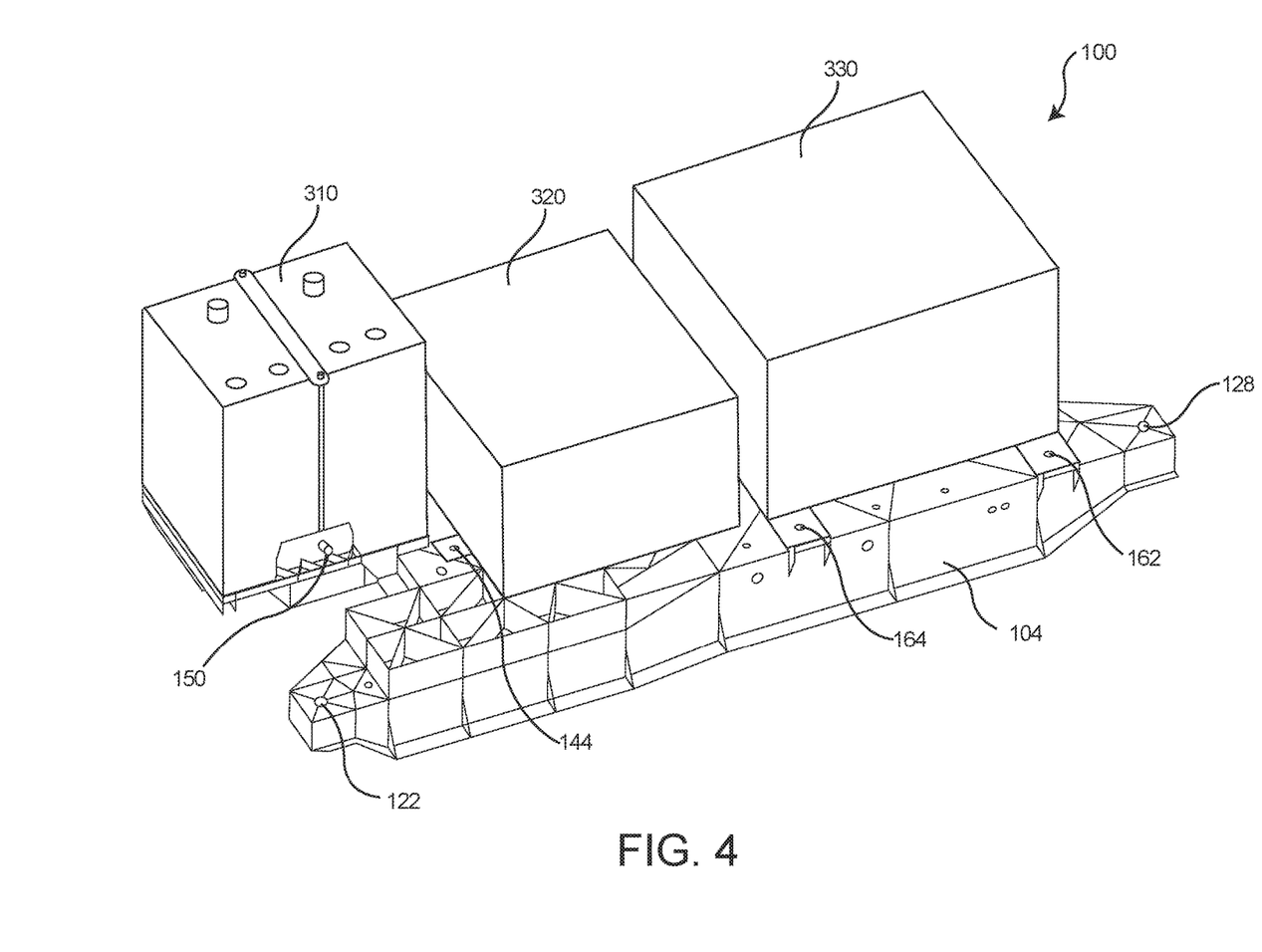
FIG. 4 illustrates the component carrier of FIG. 1 with various components affixed thereto.

FIG. 4 illustrates various components attached to the component carrier 100. The first support structure 102 and the second support structure 104 (shown in FIG. 1 and FIG. 3) support the various components. Supported on the first support structure 102 and the second support structure 104 can be a component 310, a component 320, and a component 330. In other examples, the various components 310, 320, 330 can be arranged in different locations. Other components can also be supported by the component carrier 100 as needed for the vehicle. In some examples, the component 310 can be a battery. The battery can be a lead acid battery, lithium ion battery, or some other type of battery technology. In some examples, the component 320 can be a controller, such as a microcontroller. In some examples, the component 330 can be a cooler and/or transformer.

The various components 310, 320, 330 can be attached to the component carrier 100 through conventional connection means via the attachments 140, 142, 144, 146, 150, 160, 162, 164, 166 (sometimes referred to as "attachment portions"). Such means include, but are not limited to snap fit connections, mechanical fasteners, such as bolted connections, and the like. In some examples, the connectors contain no metal parts.

In some examples, the component carrier 100 is positioned in a front portion of the vehicle, such as an electrical vehicle, and the component carrier 100 constitutes a stressed member that serves as part of the chassis 200 of the vehicle. Accordingly increasing the overall rigidity and structural strength of the chassis 200.

In some examples, the component carrier 100 can have a wall thickness of from about 1.5 mm to about 4.0 mm to assist with weight reduction. One component carrier 100 constructed consistent with the disclosure was found to have a weight of 4.6 kg compared with a conventional steel equivalent having a weight of 7.5 kg. This resulted in a weight reduction of approximately 39%. Similar weight reduction should be achieved in other comparable constructions consistent with the disclosure.

Figure 2:
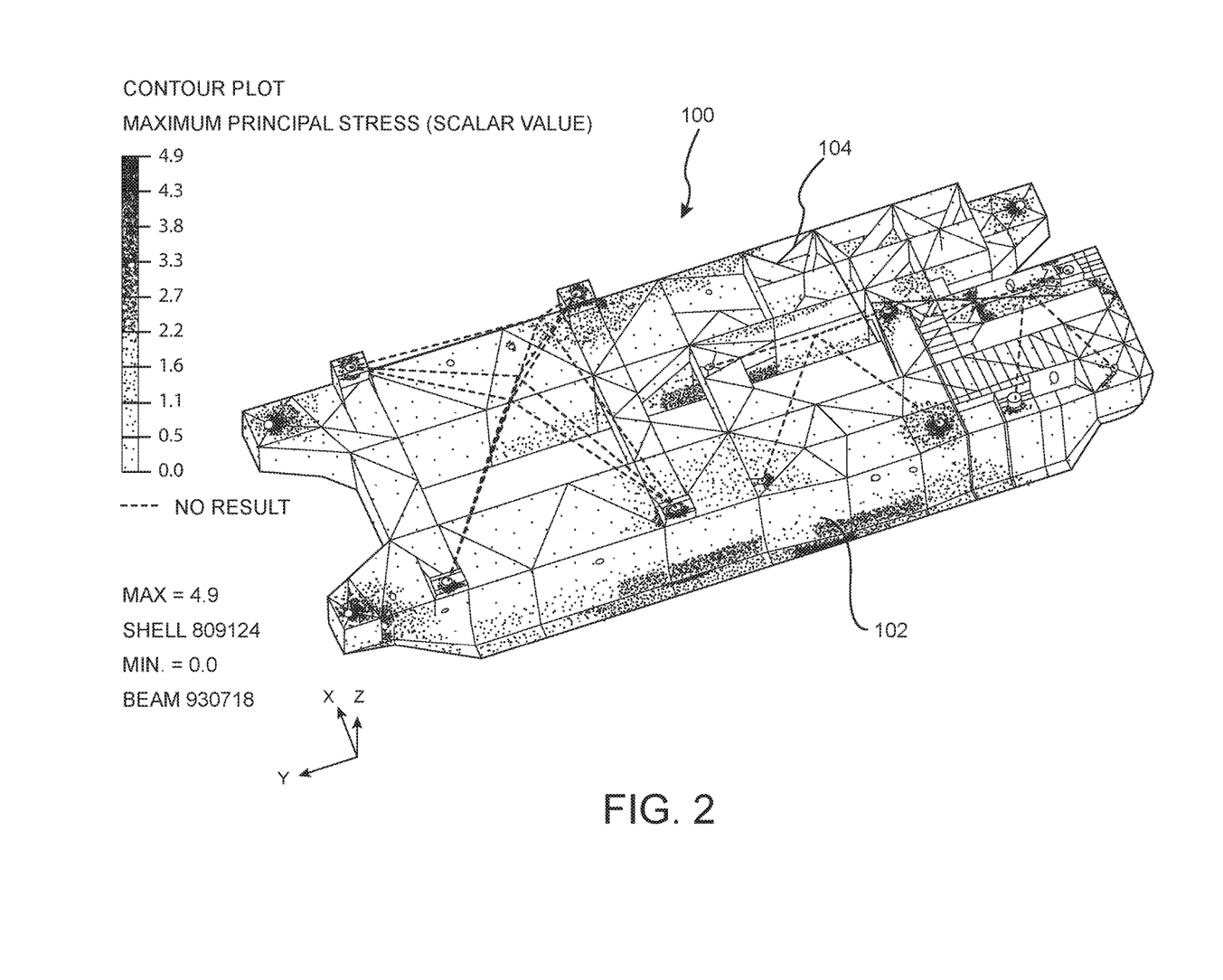
FIG. 2 illustrates a contour plot showing a maximum principal stress within the component carrier of FIG. 1.

FIG. 2 presents a contour plot showing the maximum principal stress within the component carrier 100 of FIG. 1. In FIG. 2 and Table 1, results estimated by predictive engineering methods are shown for a construction of the component carrier 100 consistent with the disclosure. The results show the construction of the component carrier 100 meets mechanical requirements, which are based on the following load cases. The X and Z directions noted in Table 1 conform to those denoted in FIG. 2. Force Fz denotes the load along the Z axis.

TABLE 1

| Load Case # | Name | Load | ° C. | Results |
|---|---|---|---|---|
| 1 | Frequency | No load | 70 | $1^{st}$ order: 105 Hz |
| 2 | Battery package stiffness in Z direction | Fz: 1 g load | 70 | Displacement (Z) 0.6 mm Maximum principal stress: 4.9 MPa |

TABLE 1-continued

| Load Case # | Name | Load | ° C. | Results |
|---|---|---|---|---|
| 3 | Battery package strength | Fz: 3 g load | 70 | Maximum principal stress: 15 MPa |
| 4 | Battery package stiffness in X direction | Fz: 0.8 g load | 70 | Displacement (X): 0.4 mm Maximum principal stress: 3.7 MPa |

Load properties were compared with those of a steel component carrier 100. Results are shown in the Table 2 below.

TABLE 2

| | STAMAX 40YM240 First order frequency | | Initial Steel First order frequency | |
|---|---|---|---|---|
| | No mass loaded | With mass loaded (70 kg) | No mass loaded | With mass loaded (70 kg) |
| | iso-tropic | slightly | iso-tropic | slightly | 182 Hz | 49 Hz |
| 23° C. | 125 Hz | 134 Hz | 27 Hz | 29 Hz | | |
| 60° C. | 104 Hz | 112 Hz | 23 Hz | 24 Hz | | |
| 70° C. | 98 Hz | 105 Hz | 21 Hz | 23 Hz | | |

Further load tests were performed using a deformation bending model. These load tests had the following results: at 23° C., $1^{st}$ order frequency was 134 Hz; at 60° C., $1^{st}$ order frequency was 112 Hz; and at 70° C., $1^{st}$ order frequency was 105 Hz.

As the battery can rest on the component carrier 100 during the lifetime of the vehicle, material creeping is also considered for structural design. Except for high stress at the fixations, stress in the component carrier 100 was found to be lower than 3.1 MPa. As such, it can be expected that no issue on material creeping will occur during the component carrier 100 lifetime.

In another load test, a maximum principal stress at 70° C. in plastic was found to be 15 MP for a component carrier 100 constructed according to the disclosure. This is a stress level that is acceptable for the intended use of the component carrier 100.

Finally, load tests showed maximum displacement at 70° C. on the plastic in X direction is 0.4 mm for the component carrier 100 constructed consistent with the disclosure. The principal stress at 70° C. in the plastic is 3.7 MPa, an acceptable stress level. The predictive results show that a construction consistent with disclosure meets the requirements for preventing mechanical failure through mechanisms such as creep and material strength deterioration during the lifetime of the component carrier 100. The construction consistent with disclosure using a PP-LGF material is observed to satisfy all considered load cases. In addition, system cost by using an injection molding method is lower than traditional steel stamping methods.

Polypropylene

Any polypropylene is suitable for use in the component carrier 100. For example, the polypropylene can be a propylene homo-polymer, a propylene—alpha olefin random copolymer, such as a propylene—ethylene random copolymer, impact propylene copolymers, sometimes referred to as hetero-phasic propylene copolymers, propylene block-copolymers.

Long Glass Fiber

Long glass fibers are known to those skilled in the art and are commercially available. Fibers can be any size and shape suitable for use in the component carrier 100. Some glass fibers have a length of about 1 to about 40 mm. In some examples, the fibers preferably having a length of from about 1 to about 30 mm such as from about 5 to about 20 mm, from about 10 to about 18 mm and about 2 to about 4 mm. Certain fibers have a diameter of about 10 to about 30 µm, such as 15 to 25 µm. Other fiber types are contemplated as well. Fibers suitable for use in the disclosure include glass fibers, carbon fibers, graphite fibers, synthetic organic fibers, particularly high modulus organic fibers such as para- and meta-aramid fibers, nylon fibers, polyester fibers, or any of the thermoplastic resins mentioned above that are suitable for use as fibers, natural fibers such as hemp, sisal, jute, flax, coir, kenaf and cellulosic fibers, mineral fibers such as basalt, mineral wool (e.g., rock or slag wool), Wollastonite, alumina silica, and the like, or mixtures thereof, metal fibers, metalized natural and/or synthetic fibers, ceramic fibers, or mixtures thereof.

One commercial source of long-glass fiber-reinforced polypropylene is SABIC's STAMAX™ plastic. STAMAX is sold commercially with 20 to 60 wt. % glass fiber content. Commercial products include those with 20, 30, 40, 50 and 60 wt. % glass fiber content.

Additives

The polypropylene can further contain additives and/or stabilizers like antioxidants, UV stabilizers, flame retardants, pigments, dyes, adhesion promoters like modified polypropylene, in particular maleated polypropylene, antistatic agents, mold release agents, nucleating agents and the like.

In addition, the polypropylene can contain further reinforcing additives like inorganic reinforcing agents such as talc, short glass fibers and glass, or organic reinforcing agents such as aramid fibers, polyester fibers, and carbon fibers.

Blowing Agent

Any suitable blowing agent can be used. In some examples, the blowing agent can be a gaseous blowing agent. Gaseous blowing agent can be at least one of nitrogen gas, oxygen gas, carbon dioxide gas, and a combination including at least one of the foregoing.

Component Carrier Formation

Any suitable method for forming the component carrier 100 can be utilized. Certain methods involve injection molding. Such techniques are well known to those skilled in the art.

One process for making a component carrier 100 includes (i) introducing a fiber-filled polypropylene, such as a glass fiber-filled polypropylene, to a hopper of an injection molding machine; (ii) melting the fiber-filled polypropylene material to form a melt in a plasticizing unit; (iii) pressurizing the plasticizing unit of the injection molding machine with a blowing agent; (iv) dissolving the blowing agent into the melt; (v) injecting the melt into a mold cavity up to 100% of volume; and (vi) forming the component carrier 100.

ILLUSTRATIVE AND NON-LIMITING EXAMPLES

Example 1

A component carrier for carrying electrical components, including a battery, for an electrical vehicle, comprising:
an injection-molded load-bearing frame to couple with and span from a right damper-tower of the electrical vehicle, transverse across the vehicle, to a coupling with a left damper-tower, the injection-molded load-bearing frame sized to translate dynamic loading from the body-in-white from the right damper-tower to the left damper-tower;

wherein the injection-molded load-bearing frame is comprised of fiber-filled polypropylene and includes a plurality of ribs oriented such that the injection-molded load-bearing frame has a first order frequency of 105 Hz or greater, at a temperature of 70° C.;

and wherein the component carrier has a stiffness in the Z direction of greater than or equal to 350 N/mm and a stiffness in the X direction of greater than 150 N/mm as measured by SAE J2464 with ambient air cycling between at 70° C. and −40° C.

Example 2

The component carrier of Example 1, wherein the load bearing frame comprises
a first support structure having a generally rectangular cross-section; and
a second support structure having a generally rectangular cross-section;
said load bearing frame further comprising attachment portions,
wherein the first support structure includes one of the attachment portions arranged at one end and one of the attachment portions arranged at the second opposite end configured for attachment to the chassis of the vehicle.

Example 3

The component carrier of Example 2, further comprising attachment portions, wherein the second support structure includes one of the attachment portions arranged at one end and one of the attachment portions arranged at the second opposite end configured for attachment to the chassis of the vehicle.

Example 4

The component carrier of Example 2 or Example 3, further comprising at least one cross member extending between the first support structure and the second support structure.

Example 5

The component carrier of Example 4, wherein the at least one cross member further comprises chamfered portions.

Example 6

The component carrier of any one of Example 4 or Example 5 further comprising reinforcing rib portions arranged on the first support structure and the second support structure.

Example 7

The component carrier of any one of Examples 4-6 comprising component attachment portions arranged on the first support structure and the second support structure.

Example 8

The component carrier of any one of Example 1-7, wherein the fiber comprises long glass fibers and wherein the long glass fibers have a length of about 1 mm to about 40 mm.

Example 9

The component carrier of any one of Examples 1-8, wherein the fiber comprises long glass fibers and additionally comprising one or more of impact modifier, filler, antioxidant and reinforcing agent in an amount of about 0.001 wt. % to about 5 wt. % based on the weight of the component carrier.

Example 10

The component carrier of any one of Examples 1-9, wherein the fiber comprises long glass fibers and wherein the amount of long glass fiber is about 10 to about 40 wt. % based on the weight of the component carrier.

Example 11

The component carrier of any one of Examples 1-10, wherein the fiber comprises long glass fibers and further comprising:
  about 55 wt. % to about 90 wt. % polypropylene;
  about 10 wt. % to about 40 wt. % long glass fiber; and
  about 0.0001 wt. % to about 5 wt. % of one or more of impact modifier, filler, antioxidant and reinforcing agent;
  said wt. % values based on the weight of the component carrier.

Example 12

The component carrier of any one of Examples 1-11, wherein the fiber comprises long glass fibers and wherein the amount of long glass fiber is about 15 wt. % to about 35 wt. %.

Example 13

The component carrier of any one of Examples 1-12, wherein the load-bearing frame is not hygroscopic.

Example 14

A process of making a component carrier comprising:
  introducing a fiber-filled polypropylene to a hopper of an injection molding machine;
  melting the fiber-filled polypropylene material to form a melt in a plasticizing unit;
  pressurizing the plasticizing unit of the injection molding machine with a blowing agent;
  dissolving the blowing agent into the melt;
  injecting the melt into a mold cavity up to 100% of volume; and
  forming a first support structure having a generally rectangular cross-section and a second support structure having a generally rectangular cross-section of the component carrier,
  wherein said component carrier is configured to be connected to a chassis of the vehicle and further configured to be a stressed member of the chassis of the vehicle.

Example 15

The process of Example 14, further comprising forming attachment portions, wherein the first support structure includes one of the attachment portions arranged at one end and one of the attachment portions arranged at the second opposite end configured for attachment to the chassis of the vehicle.

Example 16

The process of Example 14 or Example 15, further comprising forming attachment portions, wherein the second support structure includes one of the attachment portions arranged at one end and one of the attachment portions arranged at the second opposite end configured for attachment to the chassis of the vehicle.

Example 17

The process of any one of Examples 14-16, further comprising forming at least one cross member extending between the first support structure and the second support structure.

Example 18

The process of Example 17, further comprising forming reinforcing rib portions arranged on the first support structure and the second support structure.

Example 19

The process of Example 17 or Example 18, further comprising forming component attachment portions arranged on the first support structure and the second support structure.

Example 20

The method of any one of Examples 14-19, wherein the fiber comprises long glass fibers and wherein the long glass fibers have a length of about 1 mm to about 40 mm.

Example 21

The method of any one of Examples 15-20, wherein the fiber comprises long glass fibers and wherein the amount of long glass fiber is about 10 to about 40 wt. % based on the weight of the component carrier.

Example 22

The method of any one of Examples 15-21, wherein the fiber comprises long glass fibers and further comprising:
  about 55 wt. % to about 90 wt. % polypropylene;
  about 10 wt. % to about 40 wt. % long glass fiber; and
  about 0.0001 wt. % to about 5 wt. % of one or more of impact modifier, filler, antioxidant and reinforcing agent;
  said wt. % values based on the weight of the component carrier.

Example 23

A method of reducing a weight of an electrical vehicle, said method comprising using a component carrier of any one of examples 1-13.

Example 24

The method of Example 23, wherein said electrical vehicle is fully electric or a gas-electric hybrid car.

Example 25

An electric car comprising a battery holder of any one of examples 1-13.

Reference to "a polypropylene" includes mixtures of two or more such polypropylenes. Furthermore, for example, reference to a filler includes mixtures of two or more such fillers.

The phrase "component carrier" denotes an article designed and adapted for holding one or more electrical components, including a battery or plurality of battery cells, within a vehicle such as an electrical vehicle.

The phrase "electrical vehicle" denotes a vehicle that derives at least some of its power from a battery source. Such vehicles include fully electric or a gas-electric hybrid cars.

The phrase "stressed member" refers to a component that is part of the chassis of the vehicle. A stressed member is a load-bearing portion of the body-in-white that translates load, such as suspension load, from one portion of the frame to another portion of the body-in-white, rather as opposed to being passively contained by the chassis.

The "X" direction or axis bisects support structure 102 and support structure 104 as depicted in FIG. 1.

The "Y" direction or axis runs the length of support structure 102 and support structure 104 as depicted in FIG. 1.

The "Z" direction or axis is perpendicular to support structure 102 and support structure 104 as depicted in FIG. 1.

The phrase "body-in-white" refers to the vehicle structure where the vehicle body's structural components (typically sheet metal components) have been assembled but where various moving parts, the motor, chassis sub-assemblies, and trim are yet to be added to the structure.

Stiffness is measured according to SAE J2464 with ambient air cycling between 70° C. and −40° C. The boundary condition for the test are with the two ends of the carrier fixed. The ends being defined as the portions of the carrier where attachment portions 122, 124, 126 and 128, as depicted in FIG. 1, reside.

First order frequency is determined by a vibration bench test where dynamic loading with a frequency range (such as 20 to 200 Hz) is applied to a stiff point on the structure and first order frequency of the structure is determined from the vibration testing results. Typically, a climate controlled chamber is used to set temperature conditions.

The term "hygroscopic" means a composition that readily takes up and retains moisture.

The abbreviation "mm" stands for millimeter(s).

The abbreviation "μm" stands for micrometer(s).

The abbreviation "wt. %" or "wt. %" stands for weight percent and, unless otherwise noted, is based on the total weight of the article.

The abbreviation "Hz" stands for Hertz.

The abbreviation "MPa" stands for Megapascal.

The term "Fz" denotes load along the Z axis of the carrier. The Z axis is defined in FIG. 2.

"° C." is degrees Celsius.

The present methods and systems are disclosed and described above, however it is to be understood that the methods and systems are not limited to specific synthetic methods, specific components, or to particular compositions. It is also to be understood that the terminology used herein is for the purpose of describing particular examples only and is not intended to be limiting.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of examples described in the specification.

It is also to be understood that the terminology used herein is for the purpose of describing particular examples only and is not intended to be limiting. Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

The invention claimed is:

1. A component carrier for carrying electrical components, including a battery, for an electrical vehicle, comprising:
   an injection-molded load-bearing frame to couple with and span from a right damper-tower of the electrical vehicle, transverse across the vehicle, to a coupling with a left damper-tower, the injection-molded load-bearing frame sized to translate dynamic loading from the body-in-white from the right damper-tower to the left damper-tower;
   wherein the injection-molded load-bearing frame comprises a thermoplastic material,
   wherein the component carrier is configured to be a stressed member and a load-bearing portion of the body-in-white that translates load from one portion of the body-in-white to another portion of the body-in-white, and
   wherein the component carrier is integrated as one part.

2. The component carrier of claim 1, wherein the injection-molded load-bearing frame comprises a fiber-filled thermoplastic material.

3. The component carrier of claim 1, wherein the injection-molded load-bearing frame comprises a fiber-filled polypropylene.

4. The component carrier of claim 1, wherein the injection-molded load-bearing frame comprises a fiber-filled thermoplastic material, and wherein the fiber comprises long glass fibers and additionally comprising one or more of impact modifier, filler, antioxidant and reinforcing agent in an amount of about 0.001 wt. % to about 5 wt. % based on the weight of the component carrier.

5. The component carrier of claim 1, wherein the injection-molded load-bearing frame comprises a fiber-filled thermoplastic material, and wherein the fiber comprises long glass fibers and wherein the amount of long glass fiber is about 10 to about 40 wt. % based on the weight of the component carrier.

6. The component carrier of claim 1, wherein the load-bearing frame comprises:
   about 55 wt. % to about 90 wt. % polypropylene;
   about 10 wt. % to about 40 wt. % long glass fiber; and
   about 0.0001 wt. % to about 5 wt. % of one or more of impact modifier, filler, antioxidant and reinforcing agent;

said wt. % values based on the weight of the component carrier.

7. The component carrier of claim 1, wherein the component carrier has a stiffness in the Z direction of greater than or equal to 350 N/mm and a stiffness in the X direction of greater than 150 N/mm as measured by SAE J2464 with ambient air cycling between at 70° C. and −40° C.

8. The component carrier of claim 1, wherein the component carrier includes a plurality of rib portions oriented such that the injection-molded load-bearing frame has a first order frequency of 105 Hz or greater, at a temperature of 70° C.

9. The component carrier of claim 8, wherein the plurality of rib portions are arranged on the first support structure and the second support structure.

10. The component carrier of claim 1, wherein the load bearing frame comprises
a first support structure having a generally rectangular cross-section; and
a second support structure having a generally rectangular cross-section;
said load bearing frame further comprising attachment portions;
wherein the first support structure includes one of the attachment portions arranged at one end and one of the attachment portions arranged at the second opposite end configured for attachment to the chassis of the vehicle.

11. The component carrier of claim 10, further comprising attachment portions, wherein the second support structure includes one of the attachment portions arranged at one end and one of the attachment portions arranged at the second opposite end configured for attachment to the chassis of the vehicle.

12. The component carrier of claim 10, further comprising at least one cross member extending between the first support structure and the second support structure.

13. The component carrier of claim 10, wherein the at least one cross member further comprises chamfered portions.

14. The component carrier of claim 10, comprising component attachment portions arranged on the first support structure and the second support structure.

15. The component carrier of claim 1, wherein the load-bearing frame is not hygroscopic.

16. A process of reducing the weight of an electrical vehicle, said process comprising using the component carrier of claim 1 in the electrical vehicle.

17. The component carrier of claim 1, wherein the component carrier is integrated into a chassis of the vehicle and translates suspension load from the chassis to another portion of the body-in-white.

18. A process of making a component carrier comprising:
introducing a thermoplastic material to a hopper of an injection molding machine;
melting the thermoplastic material to form a melt in a plasticizing unit;
pressurizing the plasticizing unit of the injection molding machine with a blowing agent;
dissolving the blowing agent into the melt;
injecting the melt into a mold cavity up to 100% of volume; and
forming a first support structure having a generally rectangular cross-section and a second support structure having a generally rectangular cross-section;
wherein said component carrier is configured to be a stressed member of a chassis of a vehicle and to be a load-bearing portion of the body-in-white that translates load from the chassis to another portion of the body-in-white, and
wherein the component carrier is integrated as one part.

19. The process of claim 18, wherein the fiber comprises long glass fibers and further comprising:
about 55 wt. % to about 90 wt. % polypropylene;
about 10 wt. % to about 40 wt. % long glass fiber; and
about 0.0001 wt. % to about 5 wt. % of one or more of impact modifier, filler, antioxidant and reinforcing agent;
said wt. % values based on the weight of the component carrier.

20. The process of claim 18, further comprising forming reinforcing rib portions arranged on the first support structure and the second support structure.

21. The process of claim 18, further comprising forming component attachment portions arranged on the first support structure and the second support structure.

* * * * *